Jan. 26, 1965  R. WICK ETAL  3,167,381

VEHICLE SPEED DETECTION SYSTEM

Filed March 5, 1962  3 Sheets-Sheet 1

INVENTORS
RICHARD WICK
BY JOSEF PFEIFER
HEINRICH NEUMANN

Jan. 26, 1965   R. WICK ETAL   3,167,381
VEHICLE SPEED DETECTION SYSTEM
Filed March 5, 1962   3 Sheets-Sheet 2

INVENTOR.
RICHARD WICK
JOSEF PFEIFER
HEINRICH NEUMANN
BY
Richard S. Striker
Attorney Jan. 26, 1965    R. WICK ETAL    3,167,381
VEHICLE SPEED DETECTION SYSTEM
Filed March 5, 1962    3 Sheets-Sheet 3

INVENTOR.
RICHARD WICK
BY JOSEF PFEIFER
HEINRICH NEUMANN
Michael S. Striker
Attorney

United States Patent Office
3,167,381
Patented Jan. 26, 1965

3,167,381
VEHICLE SPEED DETECTION SYSTEM
Richard Wick, Grunwald, near Munich, Josef Pfeifer, Unterhaching, near Munich, and Heinrich Neumann, Munich, Germany, assignors to Agfa Aktiengesellschaft, Leverkusen, Germany
Filed Mar. 5, 1962, Ser. No. 177,520
Claims priority, application Germany, Mar. 8, 1961, A 36,911
22 Claims. (Cl. 346—107)

The present invention concerns a vehicle speed detection system installed along a road for the purpose of automatically checking whether vehicles travelling along that road exceed a maximum permissible speed. A system of this type comprises a first and a second vehicle detector device installed at two points, respectively, along the road a predetermined distance from one another, each furnishing an actuating energy pulse when passed by a vehicle travelling on the road. Such detector devices may be installed on the road surface and may be of the electrical type furnishing an electrical impulse or may be of the pneumatic type furnishing a pressure impulse. They may also be a photo-responsive arrangement or a radar type device, furnishing an electric impulse when a vehicle passes a beam of light or of electro-magnetic radiation. An electric apparatus actuated by the impulses furnished by the vehicle detector devices compares a predetermined reference time corresponding to the time required by a vehicle travelling between the detector devices at maximum permissible speed, with the actual time consumed by a vehicle travelling from the first to the second one of the vehicle detector devices. The vehicle reporting device actuated when a vehicle travelling at excessive speed is detected, may be merely a signalling device issuing an acoustic or an optical signal, preferably however a photographic camera taking a picture of the particular vehicle as its passes the portion of the road between the vehicle detector devices.

The so far known vehicle speed detection devices or arrangements are not entirely satisfactory because under certain conditions a vehicle may be reported or recorded erroneously as having exceeded the permissible speed. In particular, if a vehicle passes the road portion between the vehicle detectors at a speed substantially lower than the maximum permissible speed, then a conventional speed detecting device may be actuated by a second vehicle passing the first vehicle detector device before the first vehicle has passed the second vehicle detector. In such case the conventional detection system would compare the predetermined reference time with the time elapsed between the moment when the second vehicle passes the first vehicle detector and the moment when the first vehicle passes the second vehicle detector. This time interval may be so short that the first vehicle would be erroneously recorded or reported as having travelled at an excessive speed while in reality it was travelling at a speed substantially below the maximum permissible speed.

It is therefore one object of this invention to provide for a vehicle speed detection system which is free of the possibility of erroneously reporting a comparatively slowly travelling vehicle which is followed by a second vehicle.

It is a further object of this invention to provide for a speed detection system which is reliably operating under all circumstances.

With above objects in view the invention includes in a vehicle speed detection system installed along a road, in combination, vehicle reporting means adapted to report a vehicle passing a predetermined point on the road; actuating means including actuator relay switch means movable from open to closed position for actuating said vehicle reporting means; first vehicle detector means installed at a point of the road a predetermined distance from said predetermined point in direction opposite to the direction of traffic and including first normally open switch means movable to closed position by a vehicle passing said first detector means; second vehicle detector means installed at said predetermined point of the road and including second normally open switch means changeable to closed position by a vehicle passing said second detector means, said second detector means causing when said second switch means are in closed position, said actuator relay switch means to move to closed position; actuator means changeable from inoperative to operative position by said first switch means being moved to closed position and remaining non-responsive to repeated closing of said first switch means unless said actuator means are returned to inoperative position, said actuator means blocking, when in inoperative position, said actuator relay switch means from being moved to closed position; first timer means controlled by said actuator means so as to be started to operate when the latter are changed to operative position and returning said actuator means to inoperative position after a predetermined reference time period, said predetermined reference time period being the time required by a vehicle travelling from said first to said second vehicle detector means at maximum permissible speed; and second timer means adapted to be started to operate at the end of said predetermined time period and blocking said actuator means from being changed to operative position for a second predetermined additional time period.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
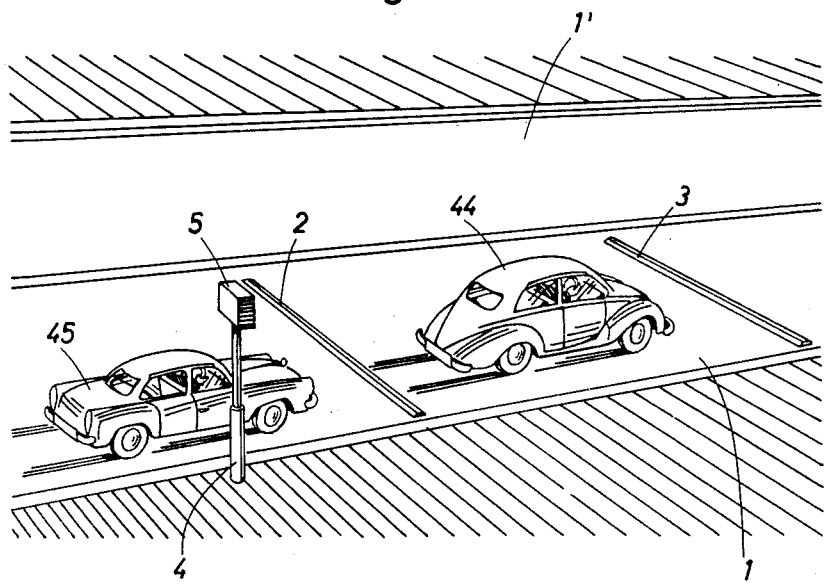
FIG. 1 is a general perspective view of a speed detection system according to the invention installed along a road.

FIG. 1 illustrates a portion of a road having two separated lanes 1 and 1'. In or on the lane 1 handling the traffic in the direction from the left toward the right as seen in FIG. 1 two vehicle detectors e.g. contact strips, 2 and 3 are installed at a predetermined distance from each other, for instance 30 feet. Near one edge of the lane 1 a column 4 is erected carrying an enclosure 5 which may contain the entire electric apparatus according to the invention and a photographic camera so oriented that it is capable of taking pictures of the rear end of a vehicle reported as travelling at an excessive speed between the vehicle detectors 2 and 3. It is to be understood that the shutter release, the film advancing device and the shutter cocking device of this camera are operated by electro-magnetic means in a well known manner. These details of the camera are not part of this invention. If desired, the camera may be supplemented by a flashlight device which is operated conjointly with the camera. The arrangement of the electrical control means according to the invention, of the camera and of a flash-light device within the enclosure 5 may be of the type described in reference to FIG. 2 of the German Patent No. 1,078,797.

Figure 2:
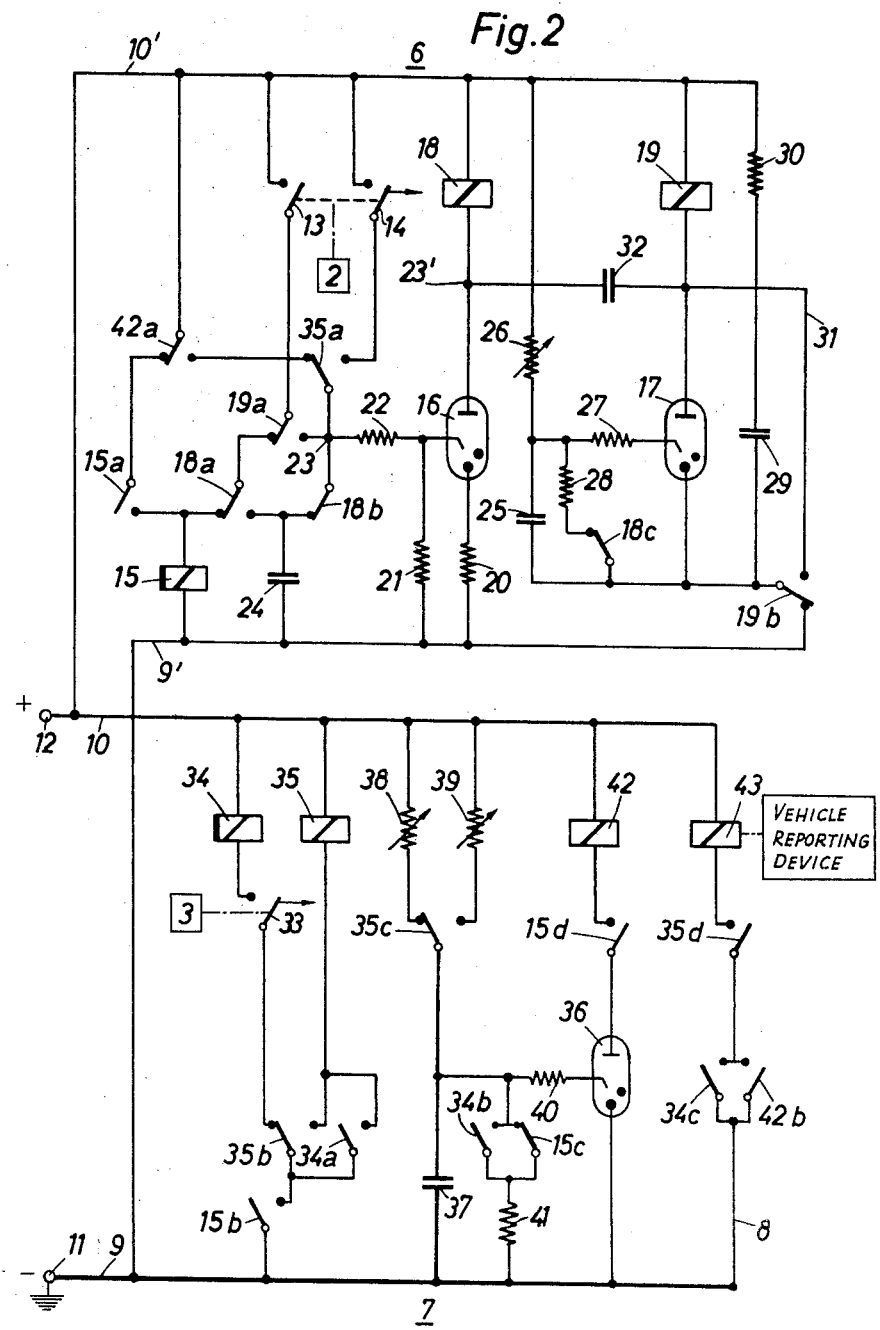
FIG. 2 is a schematic circuit diagram illustrating one embodiment of an apparatus forming part of the invention.

Referring now to FIG. 2, the electrical control arrangement according to the invention comprises mainly an actuating and blocking circuit 6, a time comparing circuit 7, and a camera actuating circuit 8. Preferably, all the operating components of the arrangement are arranged between two bus bar lines 9, 10 and 9', 10', respectively, which are connected at 11, 12, respectively, with a source of direct current furnishing positive potential to the terminal 12 and negative potential to the preferably grounded terminal 11.

The actuating and blocking circuit 6 comprises two switches 13 and 14 held normally in open position by means indicated by the arrow and mechanically coupled with each other. The switches 13 and 14 are controlled by the vehicle detector device 2 in such a manner that they are moved to closed position when a vehicle passes over the vehicle detector 2. As soon as the vehicle detector 2 is released the switches 13, 14 return to open position.

In the following description and in the drawings all relays comprise a coil designated by a reference numeral and one or more contacts designated with the same numeral as the respective coil but with a suffix $a$, $b$, $c$, etc.

The switch 13 is connected via relay contacts 19a and 18a in series with the coil 15 of a delayed return relay. The coil 15 may also be energized via the relay contacts 15a and 42a as described further below. The coil 15 operates additionally the relay contacts 15b, 15c and 15d in the time comparing circuit 7.

The actuating and blocking circuit 6 further comprises two control tubes 16, 17 connected in parallel with each other and being preferably thyratrons, a relay coil 18 being connected in the anode circuit of the tube 16 and a relay coil 19 being connected in the anode circuit of the tube 17. The relay coil 18 operates the change-over switch 18a and the relay contacts 18b and 18c in the circuit 6, while the relay coil 19 operates the change-over switch contacts 19a and 19b of the circuit 6. The cathode and the control grid of the tube 16 are connected via resistors 20 and 21, respectively, with the supply line 9', and the control grid is additionally connected via a resistor 22 with a junction point 23 which constitutes the input terminal for the blocking arrangement. This junction point 23 is connected with the relay contact 18b, with the changeover switch contact 35a of a relay described further below, and also with one stationary contact of the change-over switch contact 19a. One stationary contact of the change-over switch contact 18a and the stationary contact element of the relay contact 18b are both connected with one side of a capacitor 24 the other side of which is connected with the supply line 9'. It can be seen that the capacitor 24 may be connected in series with the switch 13, instead of the relay coil 15.

The tube 17 is a component of a time switch arrangement comprising a time determining RC circuit composed of the capacitor 25 and the variable resistor 26. The junction point between capacitor 25 and resistor 26 is connected via resistor 27 with the control grid of the tube 17, while a resistor 28 is arranged so as to be connectable by relay contact 18c in parallel with the capacitor 25. Connected in parallel with the tube 17 and the relay coil 19 is a series combination composed of a capacitor 29 and a resistor 30. By means of a bypass circuit 31 and the change-over switch contact 19b located in the cathode circuit of tube 17 it is possible to connect the capacitor 29 in circuit with the relay coil 19. The anodes of the tubes 16 and 17 are connected with each other via a capacitor 32.

As will be explained further below, the above described arrangement associated with tubes 16 and 17 constitutes a blocking arrangement.

The time comparing circuit 7 comprises a switch 33 which is normally held in open position by means represented by the arrow, and is controlled by the vehicle detector 3 in such a manner that it is moved to closed position when a vehicle engages the second vehicle detector 3. The switch 33 is arranged in circuit with the coil 34 of a delayed-return relay comprising the relay contacts 34a, 34b in the circuit 7 and the contact 34c in the camera actuating circuit 8. Moreover, the time comparing circuit 7 comprises a relay coil 35 which operates the change-over switch contact 35a in the circuit 6, the change-over switch contacts 35b and 35c in the circuit 7 and also the relay contact 35d in the camera actuating circuit 8.

In addition, the time comparing circuit 7 comprises another time switch arrangement which serves, as will be explained, a double purpose and which comprises the tube 36, preferably of the thyratron type, and two alternatively connectable variable resistors 38, 39 cooperating with a time-determining capacitor 37. This capacitor 37 which is connected with the control grid of the tube 36 across a resistor 40 may be connected in parallel with the resistor 41 by means of either one of the relay contacts 15c or 34b. In the anode circuit of tube 36 the relay contact 15d and a relay coil 42 are arranged in series with each other, the coil 42 controlling the relay contact 42a in the circuit 6 and the relay contact 42b in the camera actuating circuit 8.

The camera actuating circuit 8 comprises an electrically operable control device e.g. an electro-magnet 43 connectable in series with the relay contact 35d and either one of the realy contacts 34c and 42b. It can be seen that the device 43 can be energized only when the closing of the relay contact 35d coincides with the closing of either one of the other two just mentioned relay contacts. The electromagnet 43 serves to actuate in any suitable manner the vehicle reporting device, for instance by switching on a motor which releases the shutter of a camera contained in the housing or enclosure 5 and which after taking the picture again cocks the shutter and advances the film in the camera one step corresponding to one picture frame.

Any details of the circuits 6, 7 and 8 not described in detail above can easily be found in the circuit diagram of FIG. 2 and will be understood from the following description of the operation of this arrangement.

At the start all the tubes are extinguished and all the relays are de-energized so that all the individual relay-operated switches and contacts are in the positions illustrated in FIG. 2. The variable resistor 38 in the time comparing circuit 7 is so adjusted that the operating time of the timer constituted by the tube 36, the capacitor 37 and the resistor 38 corresponds to the time which a vehicle would consume while travelling at the maximum permissible speed from the vehicle detector 2 to the second vehicle detector 3. For instance, if the maximum permissible speed were 35 m.p.h. and the distance between the vehicle detectors 2 and 3 were 36 feet, then the resistor 38 would have to be adjusted in such a manner that the operating time of the above mentioned timer amounts to $\frac{1}{100}$ min. However, for reasons stated further below, the resistor 26 should be adjusted e.g. in such a manner that the operating time of the other timer represented by the tube 17, the capacitor 25 and the resistor 26 amounts to $\frac{3}{100}$ min. During this time interval the length of the road portion between the vehicle detectors 2 and 3 can be passed by a vehicle at a constant speed of slightly less than 12 m.p.h.

In the following description of the operation of the arrangement according to the invention two different conditions must be taken into consideration, namely a first condition when the vehicle 44 travels from the detector 2 to the detector 3 at a speed below the maximum permissible speed, and the other condition when it exceeds the permissible speed as represented by the setting of the resistor 38.

In the first case when the vehicle travels slower than at maximum permissible speed the following operations occur.

When the vehicle 44 passes with its front wheels the vehicle detector 2 the switches 13 and 14 are moved to closed condition for a brief instant whereby the relay 15 is energized via the relay contacts 18a and 19a. Consequently, the relay contact 15a is moved to closed position so that now the coil 15 remains energized via relay contacts 42a and 15a even after the switches 13, 14 have returned to their normal open position. The energization of the relay coil 15 causes also closing of the relay contacts 15b and 15d while the relay contact 15c is moved to open position. The closing of the relay contact 15d does not yet cause energization of the relay coil 42. However, the opening of the contact 15c eliminates the shunting of the capacitor 37 by the resistor 41 so that now the operation of the timer comprising the tube 36, capacitor 37 and resistor 38 is started. The time-determining capacitor 37 is charged up so that the potential at the control grid of the tube 36 rises and upon reaching a predetermined value depending upon the setting of the resistor 38 ignites the tube 36. At this moment the operating time of this timer arrangement is terminated.

This is due to the fact that at the moment of ignition of the tube 36 the relay coil 42 is energized whereby the change-over switch contact 42a is moved to its second position while the relay contact 42b is moved to closed position. The closing of contact 42b has no effect on the camera actuating electro-magnet 43 because the relay contact 35d is in open position. However, the relay 15 is now de-energized so that all the relay contacts 15a, 15b, 15c and 15d return with some predetermined delay to their original positions. Since it is presumed in this case that the vehicle 44 travels at a speed lower than the maximum permissible speed, the second vehicle detector 3 has not been reached and the switch 33 has not been moved to closed position at the moment when the relay contact 15b has been returned to open position. Therefore, an actuation of the switch 33 by the detector 3 at a later moment remains without effect.

In addition the return of the relay contacts 15a, 15c and 15d has the further result that the timing capacitor 37 of the circuit 7 is discharged across the resistor 41, the tube 36 is extinguished and the relay 42 is de-energized so that also the relay contacts 42a and 42b return to their original positions.

It should be remembered that during the brief period of conductivity of the tube 36 and energization of the coil 42 the change-over switch contact 42a has been moved to its second position. In this position the control grid of the tube 16 of the circuit 6 obtains positive potential via relay contact 35a and resistor 22 whereby the tube 16 is ignited. This tube remains in ignited condition also after the potential of the control grid drops due to the return of the contact 42a to its normal position.

The following is the operation of the blocking arrangement according to the invention.

When the tube 16 is ignited the relay coil 18 is energized and moves the change-over contact 18a to its second position while the relay contacts 18b and 18c are moved to open position. By the opening of the contact 18c the shunting of the timing capacitor 25 is eliminated so that the operation of the timer represented by the tube 17, capacitor 25 and resistor 26 is started to operate. The capacitor 25 is charged up across the resistor 26 and the relay contact 19b until, upon reaching a predetermined charge potential, the tube 17 is ignited. This causes across the capacitor 32 a negative voltage impulse appearing at the junction point 23' which causes extinguishing of the tube 16 and therefore de-energization of the relay coil 18. Consequently, the relay contacts 18a, 18b, 18c are returned to their normal positions whereby the capacitor 25 is discharged across resistor 28 while nevertheless the tube 17 remains unextinguished.

As the tube 17 was ignited the relay coil 19 was energized whereby the change-over switch contacts 19a and 19b are moved to their respective second position. Hereby first the tube 17 is shortcircuited via by-pass line 31 and thus extinguished, while the capacitor 29 which was previously charged across resistor 30 now discharges across the relay coil 19 so that this coil remains energized even after the tube 17 has been extinguished, until the capacitor 29 has fully discharged. Only then the relay 19 is completely de-energized. At this moment the relay contacts 19a and 19b return to their original position so that now all the components of the entire arrangement are again in their initial or starting position and condition.

It can be seen that during the time during which the relay coils 18 and 19 are energized and consequently the respective relay contacts 18a and 19a are in their respective second position, the relay 15 is blocked against being energized by closing of the switch 13 due to another vehicle passing over the first vehicle detector 2. Since however the start of the operation depends on energization of relay 15, the entire arrangement is blocked against being started as long as the relay coils 18 and 19 are energized. This blocking period which follows immediately the termination of the operating time of the timer arrangement 36, 37, 38 (i.e. the energization of the relay coil 42) is composed of the operating time of the timer arrangement 17, 25, 26 (i.e. energization of the relay coil 18) and the discharge time of the capacitor 29 (i.e. energization of the relay coil 19).

It can be seen further that the entire arrangement is also prevented from being started a second time during the period of energization of the relay 15 because a closing of the switches 13, 14 by actuation of the first vehicle detector 2 during this time period remains without any effect. Consequently, the entire arrangement is blocked against a second, undue actuation first during the period of time required by a vehicle to travel from the first vehicle detector 2 to the second vehicle detector 3 at the maximum permissible speed (period of energization of relay 15), and immediately thereafter for a second additional predetermined time period (determined by the setting of the resistor 26 as described above) corresponding to the time required for a vehicle to travel between the vehicle detectors at a selected substantially slower speed. This means that a second vehicle following the vehicle which has started the operation of the arrangement is not able to start again the operation of the arrangement during the just described two time periods.

If the first vehicle 44 travels between the vehicle detectors at a speed slower than the maximum permissible speed, then one can expect that its rear wheels pass the second vehicle detector 3 before a following vehicle 45 reaching the first vehicle detector 2 could re-start the arrangement after the termination of the above explained blocking period. In this manner it is made impossible that a vehicle 44 travelling at a speed lower than maximum speed and followed closely by a second vehicle 45 could be detected or recorded erroneously as travelling at an excessive speed which could occur otherwise if the second vehicle 45 were able to re-start the arrangement.

The following operations may occur as a result of the second vehicle 45 passing over the first vehicle detector 2:

(1) If the second vehicle 45 actuates the first vehicle detector 2 during the operating time of the timer arrangement 36, 37, 38 started by the first vehicle 44 through actuation of switch 13 and relay 15, then the second actuation of the switch 13 by the vehicle 45 remains without effect. However, before the time period of the blocking arrangement is terminated, not only the vehicle 44 but also the vehicle 45 will have left the road portion between the vehicle detectors so that no recording of any vehicle takes place.

(2) If the second vehicle 45 actuates the first vehicle detector 2 during the period of energization of the relay 18, then the brief closing of the switch 13 by the second vehicle 45 has only the effect that the capacitor 24 is charged. This capacitor will stay charged until the relay 18 is de-energized and the relay contacts 18a, 18b, 18c are returned to their original normal position. At this moment the capacitor 24 discharges across relay contact 18b and resistors 22 and 21 after the control grid of the tube 16 has obtained a positive voltage pulse and has again ignited tube 16. Consequently the operating time of the timer arrangement 17, 25, 26 is re-started so that due to this second energization of relay 18 the blocking time period of the arrangement is correspondingly extended. Also in this case one can expect that in all probability the vehicle 44 will have left the road portion between the vehicle detectors at the end of the blocking time period.

(3) If the second vehicle 45 actuates the first vehicle detector 2 during the energization of the relay coil 19, then the control grid of the tube 16 obtains during the brief period of closing the switch 13 by the following vehicle 45 a positive potential via relay contact 19a and resistor 22. Hereby the tube 16 is again ignited, the relay coil 18 is again energized and the resulting switching operations are again carried out. Consequently, also in this case the blocking time period of the arrangement is correspondingly extended so that again in all probability the first vehicle 44 will have left the road portion between the vehicle detectors before the end of the blocking time period.

Should the first vehicle 44 travel between the vehicle detectors 2 and 3 at a speed which is so slow that this vehicle is still located between the vehicle detectors at the time when the blocking time period ends, then a second actuation of the first vehicle detector by the following vehicle 45 before the end of the blocking time period may lead to the result that the first vehicle 44 upon passing the second vehicle detector 3 is erroneously recorded as travelling at an excessive speed. However, even this possibility is taken into consideration by the invention by providing means for taking a second photographic picture of the vehicle 44 as described further below. The comparison of the two pictures taken of the vehicle 44 and showing a very small change in the position of this vehicle along the road during the time period between taking the two pictures will show without any doubt that the recording taken by the arrangement does not prove that the vehicle 44 has travelled at an excessive speed.

It is evident that the possibility of an erronneous recording of a vehicle as described above is the smaller, the longer is the blocking time period. However, since on roads with smoothly flowing traffic inviting speed control it is rather unlikely that vehicles will travel at speeds below about 12 m.p.h., erroneous recording of vehicles are practically made impossible if the duration of the blocking time period is adjusted at the resistor 26 in the manner described for the above example so that this time period is sufficient for passing the road portion between the vehicle detectors at this low speed.

While the above described operation concerns the case when the vehicle 44 travels at a speed below the maximum permissible speed, the following applies to the condition when the vehicle 44 exceeds this maximum speed.

The operations started by the vehicle 44 actuating the first vehicle detector 2 are the same as described above. In short, when the front wheels of the vehicle 44 actuate the first vehicle detector 2, the two switches 13 and 14 are closed for a brief period of time whereby the relay 15 is energized via the relay contacts 19a and 18a so that the relay contact 15a is closed so as to hold the relay coil 15 energized even after the switches 13 and 14 have returned to open position.

Upon energization of the relay coil 15 also the relay contacts 15b and 15d are closed while the relay contact 15c is opened so that through removal of the shunting of the timing capacitor 37. The timer arrangement 36, 37, 38 of the circuit 7 is started to operate. Thus, the timing capacitor 37 starts to be charged.

Now since in this example the vehicle 44 travels faster than permissible, it will reach and actuate the second vehicle detector 3 before the operating time of the timer arrangement 36, 37, 38 has run out. Consequently, the switch 33 will be closed before the tube 36 is ignited.

By the closing of the switch 33 the relay coil 34 is energized and closes the relay contacts 34a, 34b and 34c. Consequently the relay coil 35 is energized whereby the change-over switch contacts 35a, 35b and 35c are moved to their second position. The change of the switch contact 35b de-energizes the relay coil 34 even if the switch 33 should be held in closed position for a longer period or by actuation of the vehicle detector 3 by one or more rear wheels of that vehicle. However, since the relay 34 is of the delayed-return type, the relay contact 34c remains closed just long enough for applying via the now simultaneously closed relay contact 35d an energy impulse to the camera actuating electro-magnet 43 thus causing a first shutter release of the photographic camera whereby the vehicle 44 is photographed while passing over the second vehicle detector 3.

The temporary closing of the relay contact 34b causes the capacitor 37 to discharge across resistor 41 although the capacitor 37 has not yet been charged up to igniting potential for the tube 36. Consequently, upon the following return of the relay contact 34b to its open position the timing capacitor 37 starts again to charge whereby a new operating time period of the timer arrangement containing the tube 36 is started. However, by the above mentioned change of the change-over relay contact 35c to its second position the resistor 38 has been disconnected from the timing circuit and instead the variable resistor 39 is introduced into the timing circuit. When now the capacitor 37 is charged up to a predetermined voltage depending upon the setting of the variable resistor 39, the tube 36 is ignited and energizes the relay coil 42 so that the change-over switch contact 42a is moved to its second position while the relay contact 42b is closed. Consequently the camera actuating electro-magnet 43 is now energized a second time via the still closed relay contact 35d so that a second picture of the vehicle 44 is taken. By suitable adjustment of the variable resistor 39 the time interval between the two consecutive pictures taken by the camera may be chosen to suit existing conditions, for instance it may be adjusted to 1 second.

The above mentioned movement of the change-over switch contact 42a for a brief period of time into its second position has caused de-energization of the relay 15 whereby immediately the relays 35 and 42 are likewise de-energized as well as the camera actuating electro-magnet 43. Hereby the entire arrangement is returned to starting condition. It can be seen that in this case the tube 16 is not ignited by the movement of the change-over switch contact 42a to its second position because at the same time also the change-over switch contact 35a has been moved to its second position. Consequently, in this case the blocking arrangement according to the invention comprising the tube 16, 17 and the relays 18 and 19 is not started to operate in the manner described above, at least not under normal circumstances.

Since the relay 15 remains in energized condition due to the holding contact 15a from the moment when the operation of the arrangement has been started by the actuation of the first vehicle detector 2 by the front wheels of the vehicle 44 up to the moment when the second picture of this vehicle is taken, a following vehicle 45 is not able of re-starting the operation of the arrangement during the entire time period between the above mentioned two moments. If the following vehicle 45 passes and actuates the first vehicle detector 2 before the first vehicle 44 reaches and actuates the second vehicle detector 3, no ignition of the tube 16 takes place and consequently the blocking arrangement according to the invention is not started to operate. One is entitled to assume that also the second vehicle 45 has left the portion of the road between the vehicle detectors before the first vehicle 44 has been photographed a second time and before the arrangement can be started to operate again by the arrival of a third vehicle.

However, it may occur that the second vehicle 45 travelling at extremely slow speed is erroneously recorded as speeding because the arrangement is started again due to the arrival of a following third vehicle which passes the first vehicle detector only after the first vehicle 44 has been photographed a second time. In this case the vehicle 45 would be photographed twice with a time interval depending on the operating time of the timer arrangement 36, 37, 39 so that inspection of these two pictures would show a very small change of position of the vehicle 45 during the interval between the two pictures so that an erroneous recording thereof would be evidenced.

On the other hand if the vehicle 45 passes and actuates the first vehicle detector 2 only after the first vehicle 44 passing over the second vehicle detector 3 has caused energization of the relay 35 via switch 33 and relay 34, i.e. only in the time period between the two consecutive photographs of the first vehicle 44, then the change-over switch contact 35a is still in its second position so that the actuation of the first vehicle detector 2 by the second vehicle 45 causes the control grid of the tube 16 to obtain a positive potential via the switch 14 and the switch contact 35a and resistor 22. Hereby the tube 16 is ignited and the blocking arrangement of the circuit 6 is started to operate. In this case the blocking time period may extend, depending upon the moment of being started, beyond the moment of taking the second photograph of the vehicle 44. Also in this case the blocking arrangement, once started to operate, may be re-started again and again by further following vehicles during the blocking time period. In this manner erroneous recording of the vehicle 45 by further vehicles arriving during the blocking time period is safely prevented.

It will be understood that the circuit arrangement according to FIG. 2 as described above may be modified in various ways. For instance, in FIG. 2 the timer arrangement components 36 and 37 are combined with two alternative resistors 38 and 39 in order to serve the double purpose of causing recording of speeding vehicles and also causing repetition of the photographic recording of a speeding vehicle. Instead, two separate, complete timer arrangements may be used. Further, the camera actuating circuit 8 containing the camera actuating electro-magnet 43 may be supplied from a separate source of low voltage energy instead of being supplied from the general supply lines 9 and 10.

Also the actuating and blocking circuit 6 may be modified in various ways.

Figure 3:
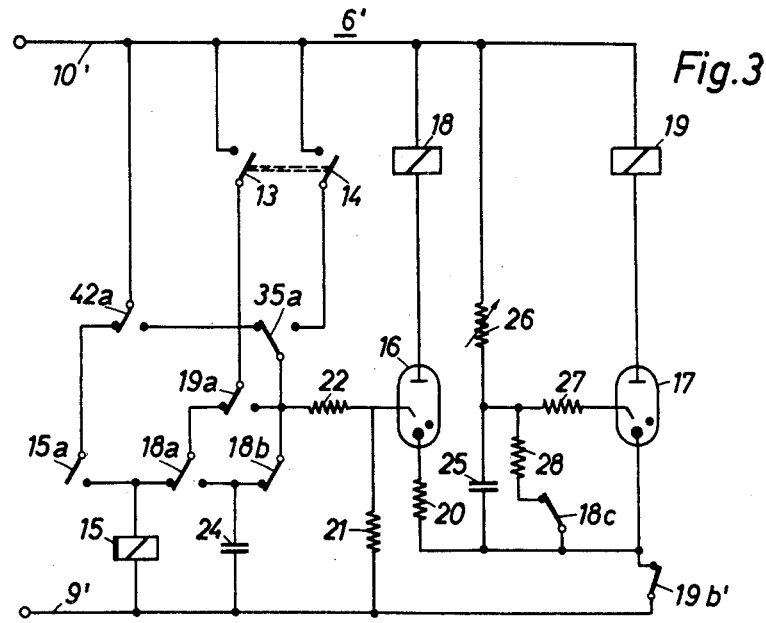
FIG. 3 is a schematic circuit diagram of a modification of a portion of the arrangement according to FIG. 2.

For example, FIG. 3 illustrates a modified circuit 6' which may be combined for cooperation with the circuits 7 and 8 of FIG. 2. The circuit 6' is generally similar as the circuit 6 of FIG. 2 except that the capacitor 29 and the resistor 30 are eliminated in which case the change-over switch contact 19b is replaced by a relay contact 19b'. In this case the operating time of the timer arrangement 17, 25, 26 can be extended correspondingly by adjustment of the resistor 26 so that the total blocking time period remains as obtainable by the arrangement according to FIG. 2. As can be further seen from FIG. 3, also the capacitor 32 can be eliminated if the cathode of the tube 16 is not directly connected via resistor 20 with the supply line 9' but via the above mentioned relay contact 19b'.

Figures 4, 5:
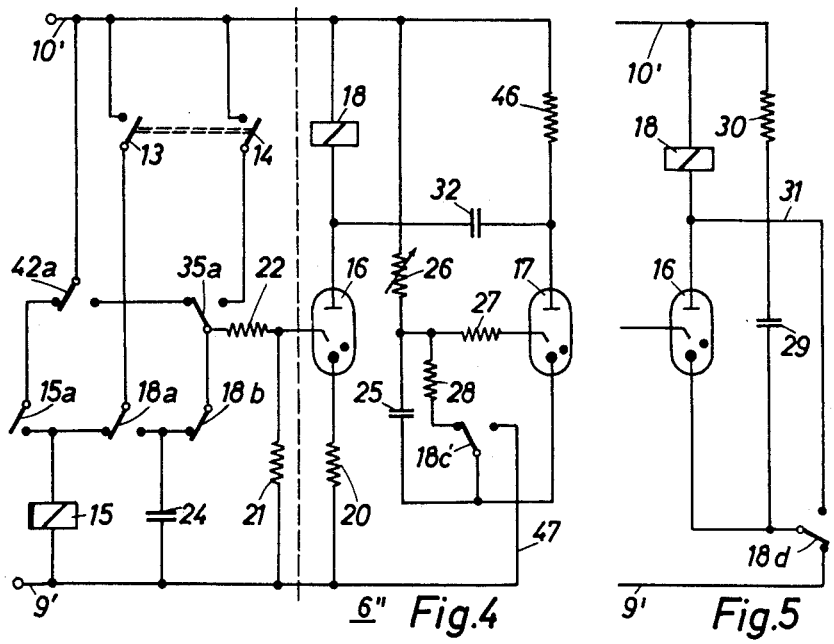
FIG. 4 is a schematic circuit diagram of a further modification of the same portion of the arrangement according to FIG. 2.
FIG. 5 is a partial circuit diagram illustrating a further modification of the arrangement according to FIG. 4.

FIG. 4 illustrates an actuating and blocking circuit 6" which is another modification of the circuit 6 of FIG. 2. In this case the relay 19 of FIG. 2 is eliminated. Instead a resistor 46 is arranged in the anode circuit of the tube 17. In this arrangement also the relay coil 19 with the relay contacts 19a and 19b of FIG. 2 are eliminated, while the relay contact 18c of FIG. 2 is replaced by a change-over switch contact 18c' which in its second position connects the capacitor 25 and the cathode of tube 17 via line 47 directly with the supply line 9'.

Also the timing arrangement 17, 25, 26 of FIG. 4 can be eliminated if that portion of FIG. 4 which is located at the right of the dotted line is replaced by the circuit portion shown in FIG. 5. In FIG. 5 the capacitor 29 and resistor 30 corresponds to the elements designated with the same numerals in FIG. 2, however the change-over switch contact 19b is replaced by a change-over switch contact 18d controlled by the relay coil 18. In this case the capacity of the capacitor 29 is to be chosen in such a manner that its discharge time corresponds to the desired blocking time period.

While in the above examples the timer means of the blocking arrangement have been described as constituted by the components 17, 25, 26 and by the capacitor 29, it should be understood that either one or both of these timing means may be replaced by a conventional mechanical timing device comprising motor driven cams cooperating with corresponding switch contacts.

While it is believed that taking two consecutive photographs of a speeding vehicle is considered of advantage for the above given reasons, it is of course also possible to take in a similar manner more than two photographs, or, while abandoning the above mentioned advantages, to take only one single photograph.

It will be understood that each of the elements described above, or two or more together, may also find a useful application in other types of a vehicle speed detection system differing from the types described above.

While the invention has been illustrated and described as embodied in a vehicle speed detection system including an automatic blocking arrangement, it is not intended to be limited to the details shown, since various modifications and structural changes may be made without departing in any way from the spirit of the present invention.

What is claimed as new and desired to be secured by Letters Patent is:

1. In a vehicle speed detection system installed along a road, in combination, vehicle reporting means adapted to report a vehicle passing a predetermined point on the road; actuating means including actuator relay switch means movable from open to closed position for actuating said vehicle reporting means; first vehicle detector means installed at a point of the road a predetermined distance from said predetermined point in direction opposite to the direction of traffic and including first normally open switch means movable to closed position by a vehicle passing said first detector means; second vehicle detector means installed at said predetermined point of the road and including second normally open switch means changeable to closed position by a vehicle passing said second detector means, said second detector means causing, when said second switch means are in closed position, said actuator relay switch means to move to closed position; actuator means changeable from inoperative to operative position by said first switch means being moved to closed position and remaining non-responsive to repeated closing of said first switch means unless said actuator means are returned to inoperative position; first timer means controlled by said actuator means so as to be started to operate when the latter are changed to operative position and returning said actuator means to inoperative reference time period, said predetermined reference time period being the time required by a vehicle travelling from said first to said second vehicle detector means at maximum permissible speed; and second timer means controlled by said first timer means so as to be started to operate at the end of said predetermined time period and blocking said actuator means from being changed to operative position for a predetermined additional time period.

2. In a vehicle speed detection system installed along a road, in combination, vehicle reporting means adapted to report a vehicle passing a predetermined point on the road; actuating means including actuator relay switch means movable from open to closed position for actuating said vehicle reporting means; first vehicle detector means installed at a point of the road a predetermined distance from said predetermined point in direction opposite to the direction of traffic and including first normally open switch means movable to closed position by a vehicle passing said first detector means; second vehicle detector means installed at said predetermined point of the road and including second normally open switch means changeable to closed position by a vehicle passing said second detector means, said second detector means causing, when said second switch means are in closed position, said actuator relay switch means to move to closed position; actuator means changeable from inoperative to operative position by said first switch means being moved to closed position and remaining non-responsive to repeated closing of said first switch means unless said actuator means are returned to inoperative position; first timer means controlled by said actuator means so as to be started to operate when the latter are changed to operative position and returning said actuator means to inoperative position after a predetermined position after a predetermined reference time period, said predetermined reference time period being the time required by a vehicle travelling from said first to said second vehicle detector means at maximum permissible speed; and second timer means adapted to be started to operate at the end of said predetermined time period and blocking said actuator means from being changed to operative position for a predetermined additional time period.

3. In a vehicle speed detection system installed along a road, in combination, vehicle reporting means adapted to report a vehicle passing a predetermined point on the road; actuating means including actuator relay switch means movable from open to closed position for actuating said vehicle reporting means; first vehicle detector means installed at a point of the road a predetermined distance from said predetermined point in direction opposite to the direction of traffic and including first normally open switch means movable to closed position by a vehicle passing said first detector means; second vehicle detector means installed at said predetermined point of the road and including second normally open switch means changeable to closed position by a vehicle passing said second detector means, said second detector means causing, when said second switch means are in closed position, said actuator relay switch means to move to closed position; actuator means changeable from inoperative to operative position by said first switch means being moved to closed position and remaining non-responsive to repeated closing of said first switch means unless said actuator means are returned to inoperative position; first timer means controlled by said actuator means so as to be started to operate when the latter are changed to operative position and returning said actuator means to inoperative position after a predetermined reference time period, said predetermined reference time period being the time required by a vehicle travelling from said first to said second vehicle detector means at maximum permissible speed; and second timer means including timing relay switch means controlled by said first timer means so as to be energized at the end of said predetermined time period, timing circuit means cooperating with said timing relay switch means, and relay contact means in circuit with said actuator means for blocking said actuator means from being changed to operative position for a predetermined additional time period determined by said timing circuit means.

4. An arrangement as claimed in claim 3, wherein said timing circuit means comprises an electron tube in circuit with said timing relay switch means, and wherein said first timer means includes switch means connected with said tube for igniting the latter at the end of said reference time period and for thereby starting said second timer means to operate.

5. An arrangement as claimed in claim 4, wherein said timing circuit means include a second electron tube so connected with said first mentioned electron tube that the latter is extinguished when said second electron tube is ignited, and means for igniting said second electron tube when said timing relay switch means is energized.

6. An arrangement as claimed in claim 5, wherein said second timing relay switch means has a coil connected in circuit with said second electron tube, and change-over switch means establishing in normal position an operating circuit for said second electron tube and said coil while extinguishing said second electron tube when in its second position, and a series-combination of capacitor and resistance means normally connected in parallel with said combination of said second electron tube and said coil, but being connected by said change-over switch means, when in said second position thereof, only in series with said coil so that said coil remains energized by the discharge of said capacitor means after extinction of said second electron tube for a period of time determined by the parameters of said series-combination.

7. An arrangement as claimed in claim 1, wherein said actuator means is a relay switch means.

8. An arrangement as claimed in claim 3, wherein said actuator means include an actuator relay switch means, and wherein said timing relay switch means includes a switch operated thereby and connected in circuit with said actuator relay switch means for blocking the energization of the latter when said timing relay switch means is energized.

9. An arrangement as claimed in claim 6, wherein said actuator means include an actuator relay switch means, and wherein both said timing relay switch means include each a switch respectively operated thereby and connected in series with each other and in circuit with said actuator relay switch means for blocking the energization of the latter when either one of said timing relay switch means is energized.

10. An arrangement as claimed in claim 4, including means for re-starting said second timer means to operate if said actuator means are changed to operative condition by said first switch means during said second predetermined additional time period.

11. An arrangement as claimed in claim 10, including storage capacitor means connectable in circuit with said first switch means for storing energy applicable for energizing said timing relay switch means.

12. An arrangement as claimed in claim 11, wherein said relay contact means are change-over switch means connecting in one position said storage capacitor means in circuit with said first switch means and connecting in another position said storage capacitor means with said timing relay switch means.

13. An arrangement as claimed in claim 12, wherein in said other position of said change-over switch means said storage capacitor means is connected with the igniting electrode of said electron tube.

14. An arrangement as claimed in claim 10, including means for connecting said storage capacitor means with said timing relay switch means at the end of said second predetermined additional time period.

15. An arrangement as claimed in claim 6, wherein said second timing relay switch means has second change-over switch means movable upon energization thereof from a first position in which it connects said first switch means with said actuator means, to a second position in which it connects said first switch means with said second timer means.

16. An arrangement as claimed in claim 1, wherein said vehicle reporting means are photographic camera means for taking at least one picture of a vehicle passing said predetermined point on the road.

17. An arrangement as claimed in claim 16, including means for taking, after a first picture, at least one second picture a predetermined comparatively small time interval after the preceding picture.

18. An arrangement as claimed in claim 4, including means for starting said second timer means also when said second switch means are changed to closed position by actuation of said second vehicle detector means.

19. An arrangement as claimed in claim 18, including a relay energized when said second switch means is changed to closed position, and having a switch operated thereby and connected with said second timer means for starting the latter upon energization of said relay.

20. An arrangement as claimed in claim 19, including an auxiliary switch means associated with said first switch means for joint operation by said joint vehicle detector means and connected with said switch of said relay for being connected thereby with said second timer means when said relay is energized.

21. An arrangement as claimed in claim 19, wherein said switch of said relay and said switch means of said first timer means are both change-over switches, the normally closed contact of the former being permanently connected with the normally open contact of the latter.

22. An arrangement as claimed in claim 1, in which said first and second timer means are so adjusted that said second predetermined additional time period has at least twice the duration of said predetermined reference time period.

References Cited by the Examiner

UNITED STATES PATENTS

| | | | |
|---|---|---|---|
| 2,683,071 | 7/54 | Pearle | 346—107 |
| 2,927,836 | 3/60 | Shore | 346—107 |
| 2,927,837 | 3/60 | Martin | 346—107 |
| 3,058,109 | 10/62 | Berning et al. | 346—1 |
| 3,060,434 | 10/62 | Biedermann et al. | 346—107 |

LEYLAND M. MARTIN, *Primary Examiner*.